United States Patent [19]

Shackle

[11] Patent Number: 5,302,474
[45] Date of Patent: Apr. 12, 1994

[54] FULLERENE-CONTAINING CATHODES FOR SOLID ELECTROCHEMICAL CELLS

[75] Inventor: Dale R. Shackle, Morgan Hill, Calif.

[73] Assignee: Valence Technology, Inc., San Jose, Calif.

[21] Appl. No.: 42,300

[22] Filed: Apr. 2, 1993

[51] Int. Cl.$^5$ ............................................. H01M 10/40
[52] U.S. Cl. .................................. 429/192; 429/218; 29/623.5
[58] Field of Search ................ 429/192, 218; 29/623.5

[56] References Cited

U.S. PATENT DOCUMENTS 5,006,431 4/1991 Hope et al. ........................... 429/192
5,009,970 4/1991 Kronfli et al. ....................... 429/192

OTHER PUBLICATIONS

Chabre et al., *J. Am. Chem. Soc.*, vol. 114:764–766 (1992).
Haufler et al., *J. Phys. Chem.*, vol. 94:8634–8636 (1990).

Primary Examiner—Stephen Kalafut
Attorney, Agent, or Firm—Russell LaPaglia

[57] ABSTRACT

This invention is directed to solid electrochemical cells containing a solid radiation cured polymer electrolyte and a cathode composed of radiation cured polymer electrolyte and fullerene.

6 Claims, No Drawings

FULLERENE-CONTAINING CATHODES FOR SOLID ELECTROCHEMICAL CELLS

FIELD OF THE INVENTION

This invention relates to electrochemical cells using an intercalation compound in the cathode. The invention particularly relates to solid electrochemical cells wherein the solid electrolyte comprises a polymer matrix. This invention is directed to such cells containing cathode compositions which include fullerene.

BACKGROUND OF THE INVENTION

The use of electrochemical intercalation permits reversible energy storage through diffusive processes. Intercalation refers to the process wherein molecules, atoms, or ions are reversibly inserted in lattice vacancies, or between the layers of a lattice, in solid materials. The solid polymer electrolyte lithium-reversible battery is the product of research on solid ionic conductors and intercalation electrodes. It combines the use of thin-film lithium-ion-conducting polymer electrolytes, with lithium-ion-reversible electrodes. This all-solid rechargeable electrochemical cell is made of two lithium reversible electrodes, one acting as a source of lithium ions during discharge, the other as a lithium ion sink. The two electrodes are separated by a thin polymer electrolyte acting as a lithium ion carrier. The electrolyte normally contains an inorganic ionic salt and a solvent. The process is reversed during recharge. The lithium ion source can be a lithium metal foil (or lithium alloy); a low-potential lithium ion insertion material (e.g. $WO_2$); or a lithium n-doped conjugated polymer. The lithium ion sink is usually a lithium ion insertion compound ($TiS_2$, $V_6O_{13}$, $MoO_2$, etc.); another lithium reducible transition metal compound such as $FeS_2$, $NiS_2$; or a p-doped conjugated polymer. The lithium metal foil anode and the lithium ion intercalatable (insertion) cathode combination is usually seen as the best choice from the point of view of energy density and discharge/recharge cyclability capacity.

In a solid polymer electrolyte battery, the lithium ion carrier is generally obtained by dissolving a lithium salt ($LiClO_4$, $LiCF_3SO_3$) in a solvating aprotic polymer such as poly (ethylene) oxide with a solvent (propylene carbonate, ethylene carbonate, tetrahydrofurane, glymes, dioxolane, etc.).

Buckminsterfullerene, $C_{60}$, was first synthesized in 1985. Five years later, a process for making it in large quantities was devised (Nature, 1990, 347, 354; Chem. Phys. Lett., 1990, 170, 167). The molecule has a structure like no other. It is a $C_{60}$ molecule composed entirely of carbon. It is a hollow shell, very nearly spherical. It is only the third form of pure carbon known in nature. The other two being diamond and graphite. Geometrically, the "bucky ball" is a truncated regular icosahedron. The $C_{60}$ member of the fullerene family is most prominent, but there are other members of the family. $C_{70}$ fullerene has the oblong shape of a rugby football, and there are smaller fullerenes, such as $C_{44}$. Partially hydrogenated fullerenes are also known, such as $C_{60}H_{36}$, which maintain the geometric structure of $C_{60}$. Haufler, J. Phys. Chem., 1990, 94, 8634, reports the ease of reduction of $C_{60}$, and suggests it should be possible to electrochemically produce stable "buckide" salts. He predicts applications such as new materials, perhaps even extending to a new class of rechargeable batteries.

Chabre et al., J. Am. Chem. Soc., 1992, 114, 764–766, demonstrated the electrochemical intercalation of lithium into solid $C_{60}$ using solid electrochemical cells and polymer electrolyte. Their cell was constructed with metallic lithium negative electrodes, a $P(EO)_8LiClO_4$ polymer electrolyte film, and a composite positive electrode containing 60% active material and 40% electrolyte by volume. The positive electrode was cast from acetonitrile suspension on a stainless steel current collector. The cells were operated at 80° C. in order to maintain the electrolyte in the high ionic conducting amorphous phase.

The ionic conductivity of solid polymer, PEO, electrolyte in lithium/fullerene batteries is a major limitation to operation at ambient temperatures, especially for applications under low temperature conditions. Warming the batteries from ordinary temperatures to minimum operating temperatures of more than 60° C. requires large and wasteful expenditures of energy.

It would be advantageous if a solid polymer electrolyte/fullerene battery could operate efficiently at lower temperatures.

It would also be advantageous if a solid polymer electrolyte fullerene battery operated in numerous discharge/recharge cycles with high cumulative capacity.

SUMMARY OF THE INVENTION

The invention relates to a solid state electrochemical fullerene-containing-cathode cell capable of discharging current at an unexpectedly high rate at temperatures below about 60° C. Surprisingly, the cells of the present invention are further characterized in being able to maintain a high current discharge rate at temperatures below room temperature.

The high energy output of the cells of the present invention is obtained by minimizing overall cell impedance. This is accomplished by minimizing impedance in each of the cell layers, as well as minimizing the impedance across the interfaces between layers. Maintaining a minimum cell impedance in accordance with the present invention is accomplished by appropriate selection of materials for forming the component layers of the cell.

In accordance with the present invention, a solid state electrochemical cell is provided. The cell includes:

a solid ionically conducting electrolyte comprising a polymeric matrix, an inorganic salt and a solvent;

a compatible anode;

a compatible cathode prepared by radiation curing and comprising a mixture of the electrolyte and fullerene; and wherein the electrolyte is operationally interposed between the cathode and the anode, and the cathode is operationally interposed between the electrolyte and the collector.

The preferred anode contains an alkali metal such as lithium or a lithium alloy. The preferred cathode, in addition to fullerene, contains the ionically-conductive electrolyte. The preferred electrolyte is a single-phase solid solution of an ionizable alkali metal salt, a solvent for the salt, and a polymer which has been polymerized by exposure to radiation, heat or which has been chemically polymerized. The preferred current collector is a nickel foil having particles of nickel electrochemically deposited on the surface of the foil which contacts the cathode composition. By minimizing the thickness of the layers so as to minimize the thickness-per-surface area ratio for each layer, the overall thickness of the cell can range from about 130 to about 350 microns.

In another aspect of this invention, a cathode composition is provided which is suitable for use in an electrochemical cell with a solid polymer electrolyte comprising a radiation polymerizable polymer precursor and fullerene. The preferred fullerene is buckminsterfullerene, $C_{60}$.

In another aspect of this invention, a method of producing a solid electro-chemical cell is provided which includes the steps of:

coating a cathode composition comprising a radiation polymerizable polymer precursor and fullerene onto a substrate such as a current collector;

coating an ionically conducting electrolyte composition comprising the radiation polymerizable polymer precursors onto the cathode composition;

partially or totally curing the cathode composition and the electrolyte composition by exposure to radiation; and applying an anode composition containing an alkali metal onto the electrolyte to form a cell assembly.

DETAILED DESCRIPTION OF PREFERRED EMBODIMENTS

The solid electrochemical cell of the present invention combines an intercalation fullerene-containing cathode with a solid, single-phase, ionically-conducting electrolyte. The cell also contains a compatible anode and a current collector.

The solid single-phase ionically-conducting electrolyte is a solid polymeric matrix containing an inorganic ion salt and a solvent.

The solid polymer matrix is a polymer, compatible for use as an electrolyte, which is formed by polymerizing an organic or inorganic monomers, oligomers or partial polymers, all of which may serve as polymer precursors, separately or in combination. When polymerized, and preferably when polymerized by radiation curing, the polymer matrix, in combination with the other components of the electrolyte, forms a solid. "Curing" refers to the treatment of the solid matrix-forming precursors under polymerization conditions (including cross-linking) so as to form a solid polymeric matrix. Suitable polymerization conditions are well known in the art and include by way of example, heating the monomer, irradiating the polymer precursors with UV light, irradiating the polymer precursors with an electron beam, etc. The resulting cured product preferably contains repeating units containing at least one heteroatom such as oxygen or nitrogen which is capable of forming donor-acceptor bonds with inorganic cations (alkali ions).

The solid polymeric matrix suitable for use in the solid electrolyte, has many embodiments. U.S. Pat. No. 4,792,504 discloses a solid polymeric electrolyte comprising a continuous network of cross-linked polyethylene oxides. U.S. Pat. No. 4,830,939 discloses ionically conducting matrices formed from monomers containing heteroatoms capable of forming donor-acceptor bonds with alkali metal cation; or non-conducting polymer matrices from which such heteroatoms are missing; including radiation polymerizable polymer precursors such as polyethylene glycol with acrylic or methacrylic acid; acrylated epoxies; polyester acrylates; acrylated polyurethane; etc. U.S. Pat. No. 5,037,712 discloses radiation curable polymer precursors which are cross-linkable polysiloxanes or polyethylene oxides. In general, suitable radiation curable materials include polycarboxylic acids such as acrylic acid and acrylates, polymeric alcohol materials, epoxy materials, polymeric imine materials and urethane materials. Such materials used alone, or to cross-link other polymer precursors, are disclosed in U.S. Pat. No. 5,030,527. The disclosures of U.S. Pat. Nos. 4,792,504; 4,830,939; 4,990,413; 5,037,712 and 5,030,527 are incorporated herein in their entirety as if fully set forth ipsis verbis.

Polyethylenically unsaturated monomeric or polymer precursors useful in the present invention are preferably compounds having at least one, and more preferably a plurality, of heteroatoms (particularly oxygen and/or nitrogen atoms) capable of forming donor-acceptor bonds with an alkali metal cation and are terminated by polymerizable moieties. These compounds yield a conductive supportive matrix. More specifically they are preferably low molecular weight oligomers of the formulae (I)-(III) below:

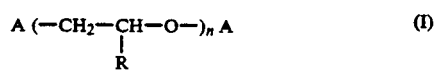

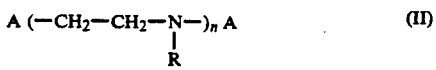

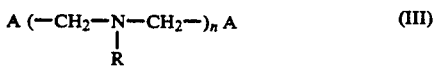

where n is about 3 to 50 and R is hydrogen or a $C_1$-$C_3$ alkyl group, which are terminated by ethylenically unsaturated moieties or glycidyl moieties represented by A.

A particularly useful group of ploymerizable compounds is obtained by reacting a polyethylene glycol with acrylic or methacrylic acid. Also useful in the present invention are curable materials such as acrylated epoxies, e.g., Bisphenol A epoxy diacrylate, polyester acrylates, copolymers of glycidyl ethers and acrylates or a vinyl compound such as N-vinylpyrrolidone. The latter provide a non-conductive matrix.

Examples of curable materials include polyethylene glycol-300 diacrylate (average PEO molecular weight about 300), polyethylene glycol-480 diacrylate (average PEO molecular weight about 480) and the corresponding methacrylates.

The polymerizable electrolyte is polymerized by radiation, heat, or chemical methods. In a particularly-preferred embodiment, the electrolyte is cured by exposure to an electron beam. The electron beam is capable of generating free radicals and initiating polymerization without any photoinitiator. Other forms of radiation, such as ultraviolet radiation, may require a photoinitiator. Similarly, if a thermal curing method is utilized, a thermal initiator should be selected. Examples of thermally-curable electrolytes are set forth in U.S. Pat. No. 4,792,504 to Schwab et al., which is hereby incorporated by reference.

An important feature of the cured electrolyte is that is remains a single phase electrolyte across a broad temperature band. When one usually compounds a carrier such as propylene carbonate and a polymer such as polyethylene oxide, the resulting material is a two-phase composition. Phase separation is particularly pronounced when the material is cooled below room temperature. By comparison, the curable composition used herein produces a single phase electrolyte. In the present invention, the monomer, salt and inert liquid are mixed together and coated. The mixture, when cured, forms a highly crosslinked polymeric network containing the alkali metal salt solution. The polymer, salt and solvent form a homogenous, single phase which is maintained upon curing, and does not readily separate upon cooling to temperatures below room temperature. The highly stable, single phase characteristic of the electrolyte contributes to low impedance.

The solid, single-phase ionically-conducting electrolyte also contains an inorganic salt and a solvent.

Ionizable alkali metal and alkaline earth salts useful in the electrolyte include those salts conventionally used in solid state electrochemical cells. Representative examples are $Li^+$, $Na^+$, $K^+$, $Mg^{2+}$, $Ca^{2+}$, and ammonium salts of less mobile anions of weak bases having a large anionic radius. Examples may be selected from the group consisting of $I^-$, $Br^-$, $SCN^-$, $ClO_4^-$, $BF_4^-$, $PF_6^-$, $AsF_6^-$, $CF_3COO^-$, $CF_3SO_3^-$, and wherein said salt cation and said salt anion are maintained in stoichiometric amounts. Specific examples are $LiAsF_6$, $LiClO_4$, $NaClO_4$, $LiCF_3SO_3$, and $LiBF_4$. $LiAsF_6$ is a particularly preferred salt as it is capable of being used in relatively high amounts.

The solvent for the salt can be any low volatile aprotic polar solvent. Preferably, these materials are characterized by a boiling point greater than about 80° C. If the polymeric network is formed by radiation or if the network is formed by thermal polymerization, the solvent should be thermally inert. In particular, the solvent should not scavenge free radicals. Low volatility simplifies manufacture and improves shelf life. Representative examples are propylene carbonate, 1,,3-dioxolane, and 2-methyltetrahydrofuran. Less polar solvents having heteroatoms capable of bonding alkali metal cations are also useful. Polyethylene glycol dimethyl ether (PEGDME) is one such example. Glymes such as tetraglyme, hexaglyme, and heptaglyme are also desirable solvents. Propylene carbonate is a preferred solvent.

The electrolyte composition typically comprises from about 5 to about 25 weight percent of an inorganic ion salt based on the total weight of the electrolyte; preferably, from about 10 to 20 weight percent; and even more preferably about 15 weight percent.

The electrolyte composition typically comprises from about 40 to about 80 weight percent solvent (e.g. organic carbonate/glyme mixture) based on the total weight of the electrolyte; preferably from about 60 to about 80 weight percent; and even more preferably about 70 weight percent.

The solid electrolyte composition typically comprises from about 5 to about 30 weight percent of the solid polymeric matrix based on the total weight of the electrolyte; preferably from about 10 to about 20 weight percent; and even more preferably about 17 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

The solid, solvent-containing electrolyte is then preferably prepared by combining a solid matrix forming monomer with an inorganic ion salt and the solvent mixture. The resulting composition is then uniformly coated onto a suitable substrate (e.g., aluminum foil, a glass plate, a lithium anode, a cathode, etc.) by means of a roller, a doctor blade, a bar coater, a silk screen or spinner to obtain a film of this composition or its solution. In some cases, it may be necessary to heat the composition so as to provide for a coatable material.

Preferably, the amount of material coated onto the substrate is an amount sufficient so that after curing, the resulting solid, solvent-containing electrolyte has a thickness of no more than about 250 microns ($\mu m$). Preferably, the solid, solvent-containing electrolyte has a thickness of from about 25 to about 250 microns, more preferably from about 50 to about 150 microns, and even more preferably from about 80–100 microns.

The cathode of the electrochemical cell contains a mixture of fullerene and electrolyte. The cathode may contain other cathode-compatible materials. The intercalation compound of the cathode composition is sometimes referred to as the "active" cathode material.

While hydrogenated and partially hydrogenated fullerenes are found in this family of compounds, the dehydrogenated fullerenes are preferred in the practice of this invention, and buckminsterfullerene, $C_{60}$, is particularly preferred. The fullerene is preferably used in solid amorphous or crystalline form, most preferably as crystallites. The method of manufacture of buckminsterfullerene in a contact arc between graphite electrodes which produces a black, graphitic powder from which $C_{60}$ is extracted, has been described, R. E. Haufler et al., J. Phys. Chem., 1990, 94, 8634.

The cathode is composed of materials which enable it to function as a positive electrode in the solid electrochemical cell. In addition to fullerene, conductive materials may be added to the cathode composition such as carbon, metallic particles, and the like.

In the preferred embodiment, the cathode is prepared from a mixture of electrolyte and fullerene, and optionally, other cathode compatible material, which is handled as a cathode paste. The cathode comprises active cathode materials which are preferably of a particle size less than one micron, but which can range over 20 microns in size. The active component of the electrode comprises between about 15 and about 75% by weight of the entire cathode composition, preferably between about 25 and 65% and most preferably between about 45 and 55%. The electrolyte makes up from about 25% to about 85% by weight of the cathode composition, preferably from about 35% to about 75% by weight. Conductive materials make up the remainder of the cathode composition. In the preferred embodiment, the polymeric electrolyte, which functions as the solid ionically-conducting electrolyte, operationally interposed between the cathode and the anode, is identical in composition to the electrolyte component of the cathode composition, but it need not be identical.

The cathode paste is typically spread onto a substance such as a current collector and cured to form a solid, positive electrode. The cathode (excluding the substrate) generally has a thickness of about 20 to 150 microns.

The anode is composed of compatible anodic materials, i.e. materials which function as the negative electrode in a solid electrochemical cell. Such compatible materials are well known in the art and include, by way of example, alkali metals, such as lithium foil, a lithium foil-coated nickel on copper foil, or a lithium alloy. Lithium alloys include Li-Al, Li-Si, Li-Sn, Li-Cd, Li-Zn, Li-Pb and Li-Ni. For some applications, a lithium anode or lithium-alloy anode is used, however, in most applications, a lithium foil or lithium coated metal foil is used. While lithium is a preferred anode material because it is very electropositive and light in weight, other electropositive alkali metal materials, such as sodium, may be practiced within the scope of the invention. Several workers in the field have suggested the use of anodes which include or consist of lithium intercalation compounds, U.S. Pat. Nos. 5,069,683; 5,147,739 and J. Electrochem. Soc., 1991, Vol. 138, No. 10, 2864. The advantage of such anodes, which can be used within the scope of the invention, are the elimination or reduction of the metallic lithium content of the cell. Such intercalation anodes function at their best with high lithium capacity intercalation cathodes. The intercalation fullerene-containing cathode of the invention can function as the needed high lithium capacity cathode.

Current collectors for use in solid electrochemical cells are commercially available. A preferred current collector for the cathode is roughened nickel (electrolytically deposited nickel) on a nickel substrate (available as CF18 NiT Fukuda Metal Foil and Powder Co., Ltd., Kyoto, Japan). The current collector is preferably attached to the cathode so that the cathode is operationally interposed between the current collector and the solid electrolyte. However, a configuration may be selected in which the current collector is attached to the anode, so that the anode is operationally interposed between the current collector and the solid electrolyte.

Operational interposition signifies the ability of the electrochemical cell to function as a source of electric current, and its ability to be recharged, within the operational specifications of the cell.

In the manufacture of the electrochemical cell, the resulting solid electrolyte is a homogeneous single-phase material which is maintained upon curing and does not readily separate upon cooling to temperatures below room temperature.

In the manufacture of the cell, it is desirable to avoid the use of any protic materials which may be incorporated into the battery. For example, most of the protic inhibitors in di- and triacrylate monomers as well as the urethane acrylate prepolymers are preferably removed prior to formation of the cathode and/or electrolyte. In this regard, removal of these inhibitors down to a level of less than 50 parts per million (ppm) can be accomplished by contacting these monomers and prepolymers with an inhibitor remover. Suitable inhibitor removers are commercially available.

In a preferred embodiment, the process of forming an electrochemical cell comprises the steps of coating the surface of a cathode with a composition comprising a solid matrix forming polymer precursor, an inorganic ion salt and a solvent or solvent mixture. The composition is then cured to provide for a solid electrolyte on the cathodic surface. The anode, for example, a lithium foil, is then laminated to this composite product in such a way that the solid electrolyte is operationally interposed between the lithium foil and the cathodic material. However, the process can be reversed so that the surface of an anode is coated with a composition comprising a solid matrix forming precursor, an inorganic ion salt and a solvent or solvent mixture. The composition is then cured to provide for a solid electrolyte on the anodic surface. The cathode is then laminated to this composite product in such a way that the solid electrolyte is operationally interposed between the anode and the cathodic material.

Methods for preparing solid electrolytes and electrochemical cells are set forth in U.S. Pat. Nos. 4,830,939 and 4,925,751 which patents are incorporated herein by reference in their entirety.

While the invention has been described in terms of various preferred embodiments, the skilled artisan will appreciate the various modifications, substitutions, omissions and changes may be made without the parting from the spirit thereof. The descriptions of subject matter in this disclosure are illustrative of the invention and are not intended to be construed as limitations upon the scope of the invention.

What is claimed is:

1. A solid electrochemical cell comprises:
    a solid ionically conducting electrolyte comprising a polymeric matrix, an inorganic salt, and a solvent;
    a compatible anode;
    a compatible cathode prepared by radiation curing and comprising a mixture of said electrolyte and fullerene; and
    a current collector;
    wherein said electrolyte is operationally interposed between said cathode and said anode, and said cathode is operationally interposed between said electrolyte and said collector.

2. A cell according to claim 1 wherein said anode comprises materials selected from the group consisting of lithium and lithium alloys.

3. A cell according to claim 1 wherein said fullerene is $C_{60}$.

4. A method of producing a solid electrochemical cell comprising the steps of:
    coating a cathode composition comprising a radiation polymerizable polymer precursor and fullerene onto a substrate;
    coating an ionically conducting electrolyte composition comprising said radiation polymerizable polymer precursors onto said cathode composition;
    partially or totally curing said cathode composition and said electrolyte composition by exposure to radiation; and
    applying an anode composition comprising lithium onto said electrolyte to form a cell assembly.

5. A method according to claim 4 wherein said radiation is electron beam radiation.

6. A cathode composition suitable for use in an electrochemical cell with a solid polymer electrolyte, comprises radiation polymerizable polymer precursors and fullerene.

* * * * *